(12) United States Patent
Bakshi et al.

(10) Patent No.: US 7,296,779 B2
(45) Date of Patent: Nov. 20, 2007

(54) EXTENDIBLE LEG

(75) Inventors: Nikesh Bakshi, Granger, IN (US);
Adam Tipton, Mishawaka, IN (US);
Craig J. Reske, Niles, MI (US)

(73) Assignee: Actuant Corporation, Columbus, WI (US)

( * ) Notice: Subject to any disclaimer, the term of this patent is extended or adjusted under 35 U.S.C. 154(b) by 7 days.

(21) Appl. No.: 11/287,763

(22) Filed: Nov. 28, 2005

(65) Prior Publication Data

US 2006/0113452 A1    Jun. 1, 2006

Related U.S. Application Data

(60) Provisional application No. 60/631,404, filed on Nov. 29, 2004.

(51) Int. Cl.
*F16M 7/00* (2006.01)

(52) U.S. Cl. .................... 248/677; 248/354.1; 254/425

(58) Field of Classification Search ............... 248/351, 248/352, 354.7, 354.1, 677; 280/676.1, 763.1, 280/475; 254/103, 425
See application file for complete search history.

(56) References Cited

U.S. PATENT DOCUMENTS

| | | | |
|---|---|---|---|
| 3,632,086 A | | 1/1972 | Mai |
| 4,723,744 A | * | 2/1988 | Baker et al. ................ 248/165 |
| 4,756,642 A | * | 7/1988 | Quinn et al. .................. 405/7 |
| 5,273,256 A | | 12/1993 | Chambers |
| 5,575,492 A | * | 11/1996 | Stone ........................ 280/475 |
| 5,676,018 A | | 10/1997 | VanDenberg |
| 6,446,937 B1 | | 9/2002 | Straw, Sr. et al. |
| 6,623,035 B1 | | 9/2003 | Schneider |
| 6,722,635 B2 | | 4/2004 | Erickson |
| 2002/0180198 A1 | * | 12/2002 | Schubert et al. ......... 280/763.1 |
| 2006/0119089 A1 | * | 6/2006 | Rivers et al. ............ 280/763.1 |

* cited by examiner

*Primary Examiner*—Ramon O Ramirez
(74) *Attorney, Agent, or Firm*—Quarles & Brady LLP

(57) ABSTRACT

An extendible leg adapted for mounting to a vehicle includes an outer member and an inner member. The inner member is telescoped slidably into the outer member, and has a first end extending axially beyond said outer member. A nut is fixed relative to the inner member. A rotatable screw is axially fixed relative to the outer member and threadably engaging the nut, wherein rotation of the screw axially drives the nut to axially move the inner member relative to the outer member.

20 Claims, 13 Drawing Sheets

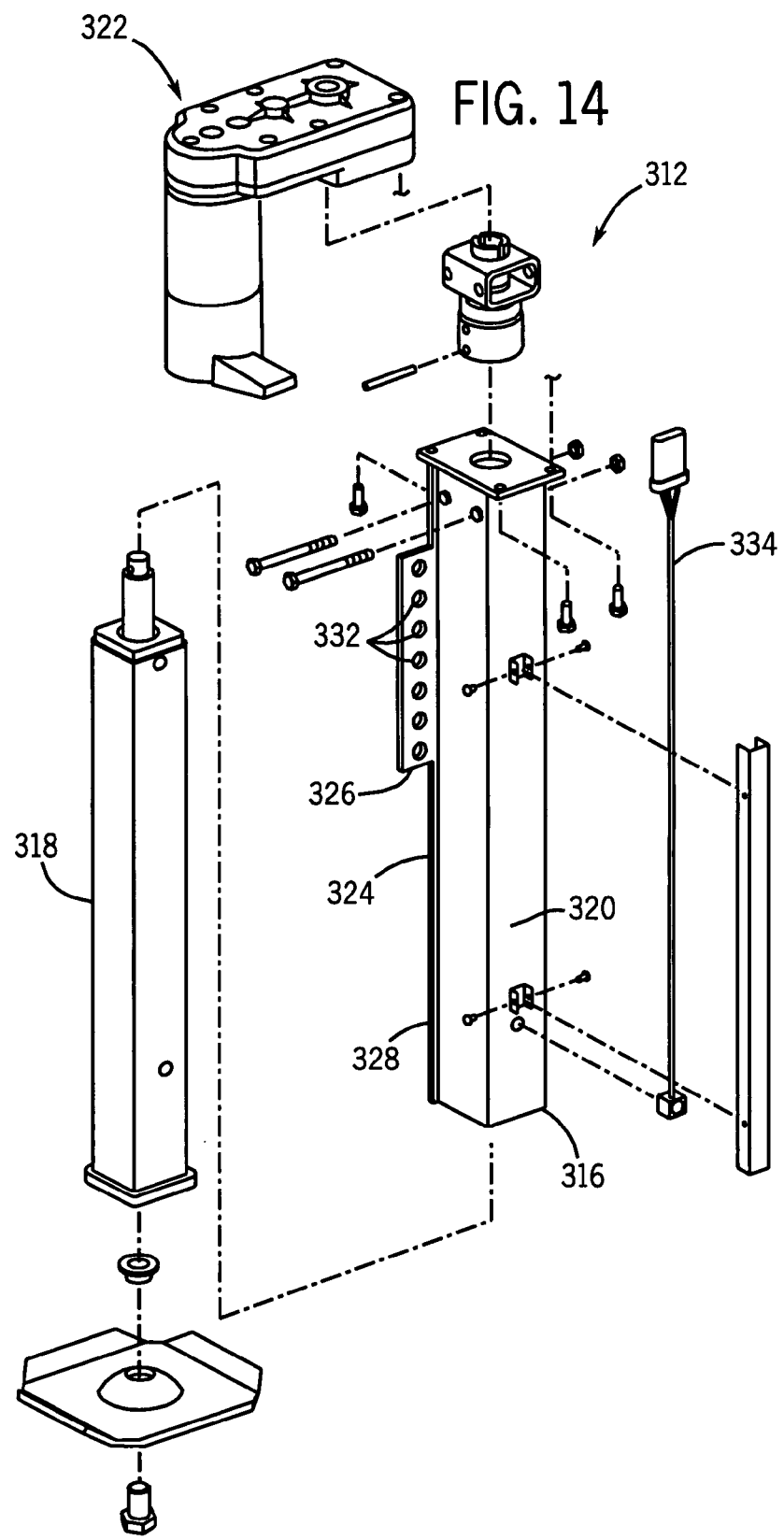

EXTENDIBLE LEG

CROSS REFERENCES TO RELATED APPLICATIONS

This application claims the priority benefit of U.S. Provisional Patent Application No. 60/631,404 filed on Nov. 29, 2004.

STATEMENT REGARDING FEDERALLY SPONSORED RESEARCH

Not Applicable

TECHNICAL FIELD

This invention relates to extendible legs for vehicles, and more particularly, an improved extendible leg suitable for use as a leveling leg for recreational vehicles and landing gear for semi-trailers.

DESCRIPTION OF THE BACKGROUND ART

Vehicles, such as a recreational vehicle or semi-trailers, incorporate extendible legs to support, level, or raise the vehicle. Semi-truck trailers utilize extendible legs as landing gear legs in a landing gear assembly to raise and support the front of the trailer when disengaged from a semi-truck tractor.

Recreational vehicles, such as motor homes, trailers, and the like, often include one or more extendible legs proximal each end of the recreational vehicle. The legs can be extended individually, or as part of a vehicle leveling system, such as disclosed in U.S. Pat. No. 5,176,391, to level the recreational vehicle.

A typical semi-truck tractor and trailer are attached utilizing a "fifth wheel" type connection. A fifth wheel connection has a lubricated flat swivel plate and catch assembly mounted on the semi-truck tractor to engage a corresponding lubricated flat swivel plate and downwardly protruding "king pin" mounted on the underside of the forward portion of the trailer. The trailer king pin is received in a slot in the tractor swivel plate where it engages the tractor catch assembly locking the tractor and trailer together.

In order to disengage the tractor from the trailer, landing gear legs mounted on a forward section of the trailer are extended to the ground raising the king pin upwardly disengaging it from the catch assembly. Upon disengagement, the tractor pulls away from the trailer which is now supported by trailer rear wheels and the landing gear.

Known extendible legs, suitable for use as a landing gear leg and leveling leg, such as disclosed in U.S. Pat. No. 4,307,896, are formed with interfitting box-section supporting members. In U.S. Pat. No. 4,307,896, the interfitting box-sections have a axially driven ground engaging member telescopically interfitted with a box-like fixed member which is mounted to the vehicle. The ground engaging member telescopes between a retracted position and an extended position.

Typically the axially driven ground engaging member is manually or electrically driven in the telescoping direction. The driven member can be damaged when the driven member abruptly reaches the end limit of travel at either the extended or retracted position. In electrically driven landing gear, when the driven member abruptly reaches the end limit, the motor forming part of the drive mechanism remains energized until the operator turns the motor off, or the motor amperage exceeds a predetermined level which signals a control system controlling the motor to deenergize the motor. The sudden stop at the end limit can damage the drive mechanism and/or the members, and continued energization of the motor can cause the motor to overheat.

In recreational vehicle leveling legs, in order to withstand the forces exerted on the legs, the leg members are typically formed from tubes formed to tight tolerances to minimize gaps between the fixed leg member and the driven leg member. Providing tubes built to tight tolerances increases the cost of the leg. The tubes then form part of welded assemblies that provide a rigid structure to further strengthen the leg. Unfortunately, the welded assemblies are practically impossible to disassemble. As a result, if an internal component, such as a bearing, nut, thread screw, and the like fail, the entire landing gear is replaced.

Legs having a ground engaging member axially driven by a thread screw engaging a nut have additional problems. Radial and axial forces exerted on the thread screw are transferred to a drive shaft extending from the landing gear drive mechanism and rotatably driving the thread screw. These forces can cause the drive mechanism to bind and/or prematurely fail. In addition, side loads exerted on the ground engaging member of the landing gear can misalign the screw with the nut causing the screw and nut to bind or completely fail. Accordingly, a need exists for an improved extendible leg that overcomes one or more of the above problems.

SUMMARY OF THE INVENTION

The present invention provides an extendible leg adapted for mounting to a vehicle. The leg includes an outer member telescopically receiving an inner member. The inner member is telescoped slidably into the outer member, and has a first end extending axially beyond said outer member. A nut is fixed relative to the inner member. A rotatable screw is axially fixed relative to the outer member and threadably engaging the nut, wherein rotation of the screw axially drives the nut to axially move the inner member relative to the outer member.

A general objective of the present invention is to provide an improved extendible leg that solves one or more of the above deficiencies in the prior art. This is accomplished by providing an extendible leg including one or more of the features described herein.

In particular, in one embodiment disclosed herein the extendible leg includes a thread screw that threadably engages a nut to axially drive the inner member telescopically in the outer member. The thread screw and nut are detachably fixed to the outer member and inner member, respectively to simplify disassembly of the landing gear for service.

In another embodiment disclosed herein, the extendible leg includes a resilient member interposed between the inner member and the nut. The resilient member allows the inner member to pivot relative to the outer member in order to maintain the screw substantially aligned with the nut upon deflection of the inner member relative to the outer member by a side load.

In yet another embodiment disclosed herein, the extendible leg includes a biasing member interposed between an outer member assembly including the screw and an inner member assembly including the nut. The biasing member cushions the inner member relative the outer member as the inner member approaches a travel limit.

In yet another embodiment disclosed herein, the extendible leg includes a low friction material interposed between inner and outer surfaces of the outer and inner members. The low friction material close the gap between the inner and outer members formed from standard sized tubes.

Finally, in another embodiment disclosed herein, the extendible leg includes a drive shaft coupled to the screw by a connecting assembly that transfers axial and radial forces from the screw to the outer member. The connecting assembly minimizes forces that are transferred from the screw to the drive shaft.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 14 is an exploded view of the extendible leg shown in FIG. 14.

DETAILED DESCRIPTION OF THE PREFERRED EMBODIMENTS

Figure 1:
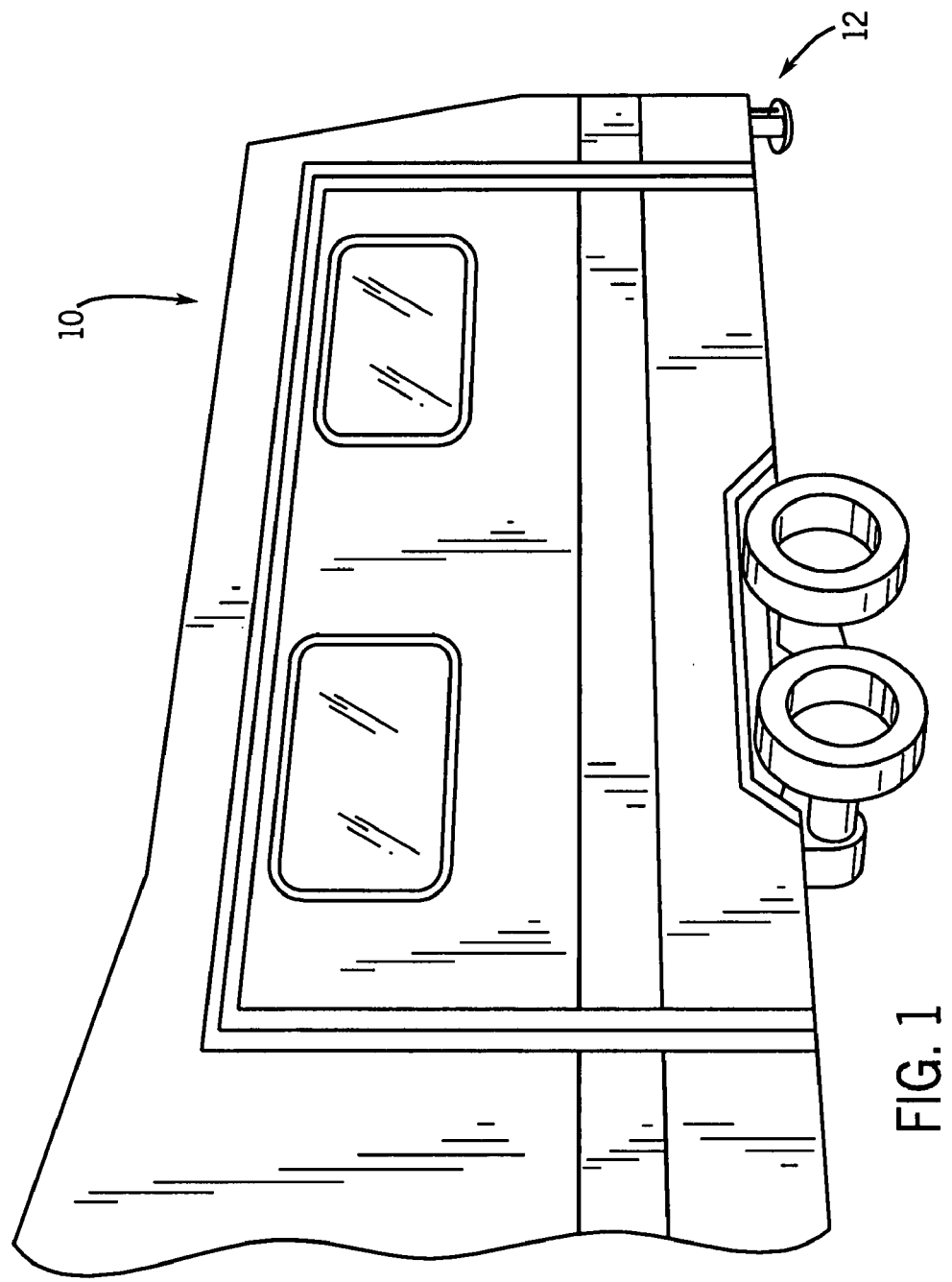
FIG. 1 is a perspective view of a vehicle incorporating the present invention.

Referring to FIGS. 1-4, a vehicle 10, such as a recreational vehicle trailer, motor home, semi-trailer, and the like, has a vehicle leveling system comprising extendible legs 12. Preferably, the system includes at least one leg 12 at each end of the vehicle 10 to level the vehicle 10. Most preferably, the system includes a leg 12 proximal each corner of the vehicle 10. Each leg 12 has an outer member 16 and a telescoping inner member 18. The telescoping inner member 18 is forcibly slidably driven by a drive mechanism 22 between a retracted and an extended position.

The extendible legs 12 can be driven independently by separate drive mechanisms 22, such as described herein, or by a single drive mechanism coupled to two or more legs 12, without departing from the scope of the invention. Regardless of whether the legs 12 are driven independently, or both are driven by a single drive mechanism 22, the structure of the extendible legs 12 is substantially identical. Accordingly, one leg 12 will be described with the understanding that the description applies to the other legs 12, as well.

Figure 3:
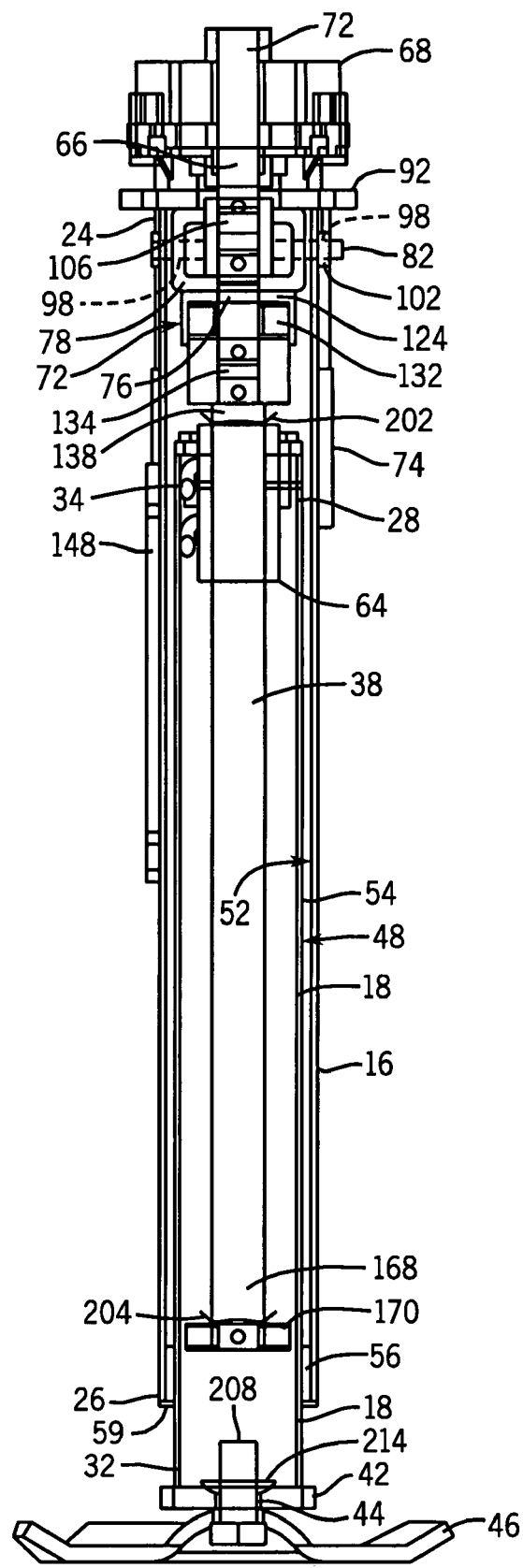
FIG. 3 is a front cross sectional view along line 3-3 of FIG. 2.

Referring to FIG. 3, the extendible leg 12 includes the tube shaped outer member 16 having a first end 24 rigidly mounted to the drive mechanism 22 and an open second end 26. Preferably, the outer member 16 is a square tube, formed from steel or other suitable material having similar strength characteristics. An outer member top plate 92 that covers the top of the outer member first end 24 is bolted to the gear box 68 to rigidly fix the outer member 16 relative to the drive mechanism 22. Although a square tube is described herein, any shaped tube may be used without departing from the scope of the present invention. Moreover, the tube shaped outer member 16 can be formed from a single length of tube shaped material or two or more pieces of material, such as a length of U-shaped material joined to a plate forming the tube shaped outer member 16, to reduce material costs without departing from the scope of the invention.

The inner member 18 has a shape corresponding to the outer member 16 with a first end 28 disposed inside the outer member 16 and a second end 32 extending out of the outer member second end 26. A top plate 34 fixed, such as by welding, to the first end 28 of the inner member 18 closes the inner member first end 28 and includes a center aperture 36 for receiving a thread screw 38 therethrough. A bottom plate 42 fixed, such as by welding, to the second end 32 of the inner member 18 closes the inner member second end and includes a threaded aperture 44 for bolting a foot 46 thereto. The outer surface 48 of the inner member 18 can be proportioned so as to form a close sliding fit within the inner surface 52 of the outer member 16. Engagement between the inner and outer surfaces 52, 48 provides structural support to the inner and outer members 18, 16. Preferably, the inner member 18 is formed from the same or similar material as the outer member.

Figure 4:
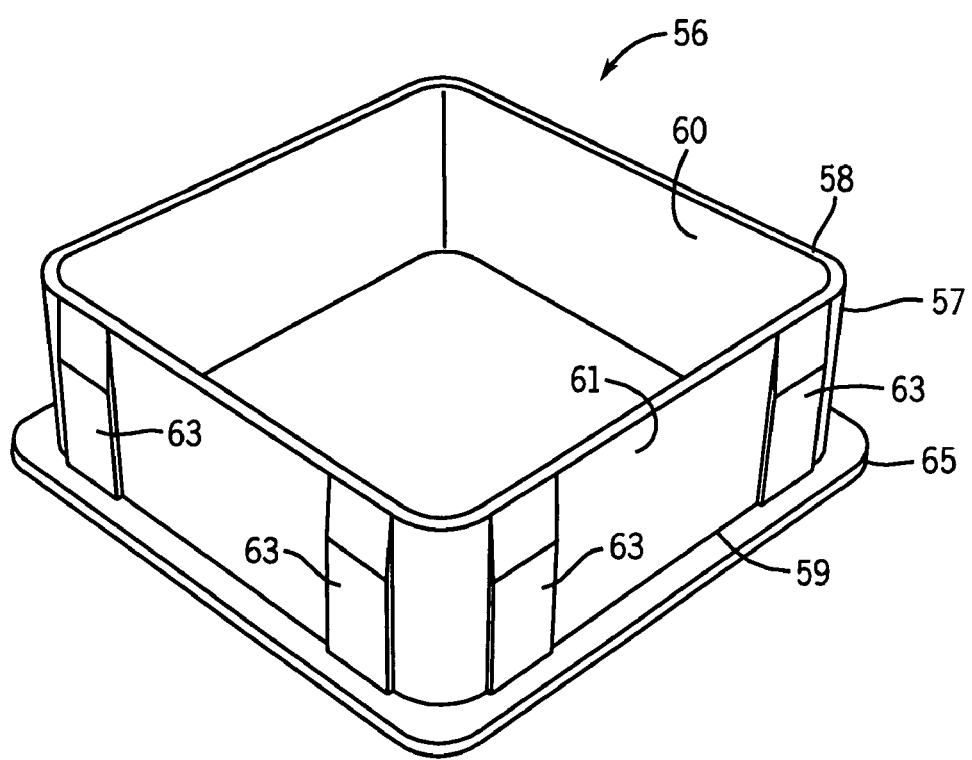
FIG. 4 is a perspective view of the wear sleeve of FIG. 3.
Figure 5:
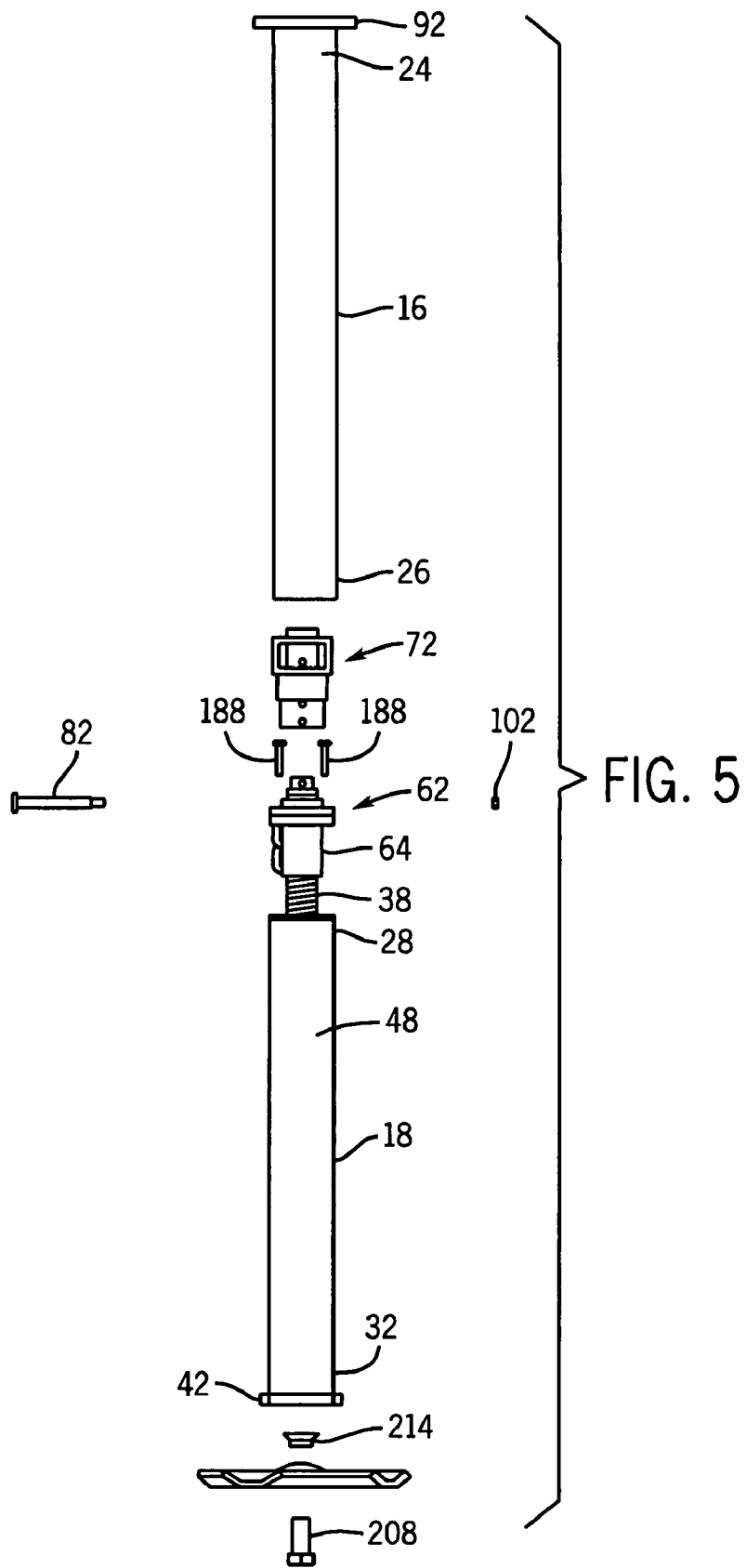
FIG. 5 is an exploded view of the extendible leg of FIG. 2 without the drive assembly.
Figure 6:
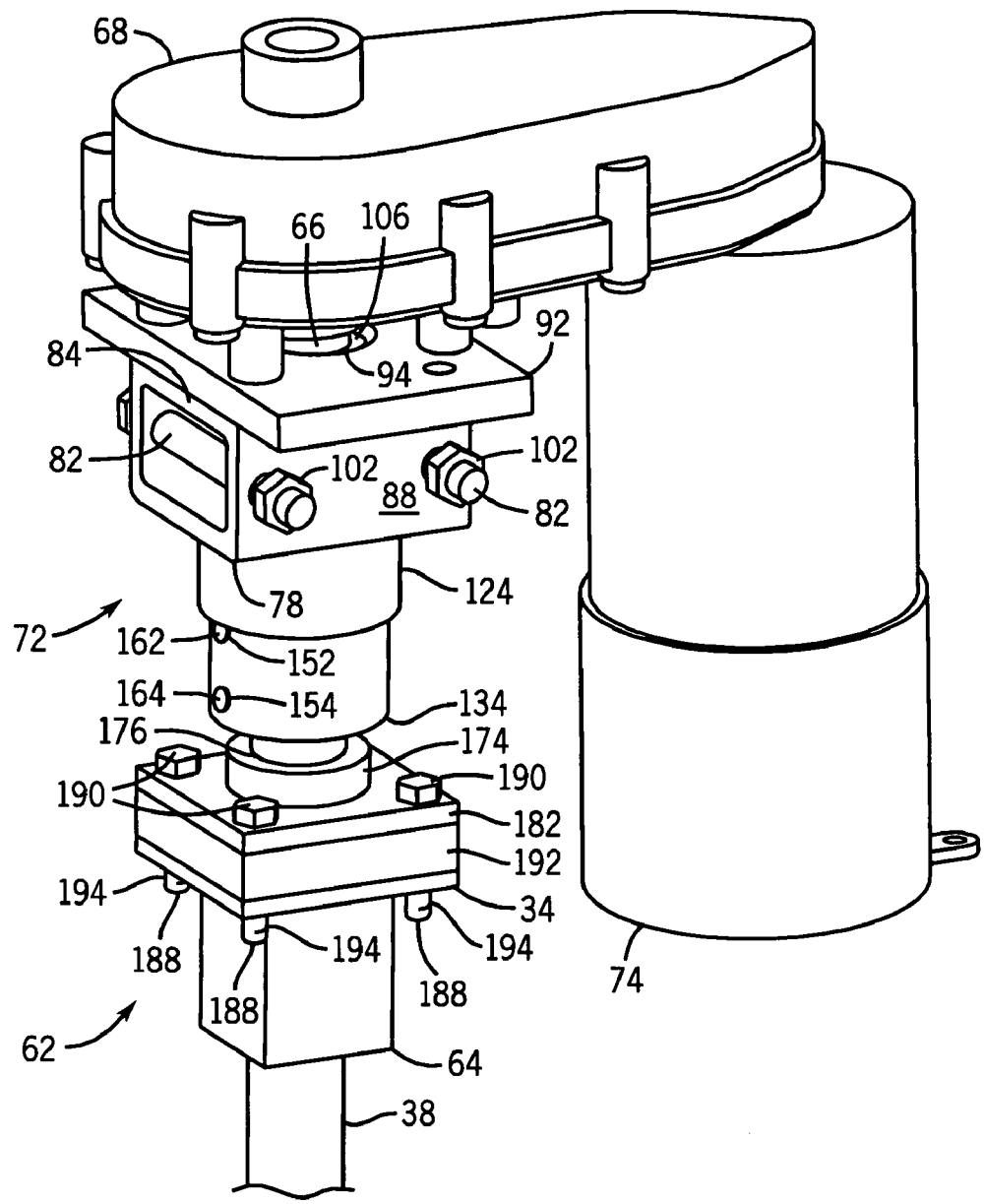
FIG. 6 is a detailed perspective view of the extendible leg of FIG. 2 with the inner and outer members removed.
Figure 7:
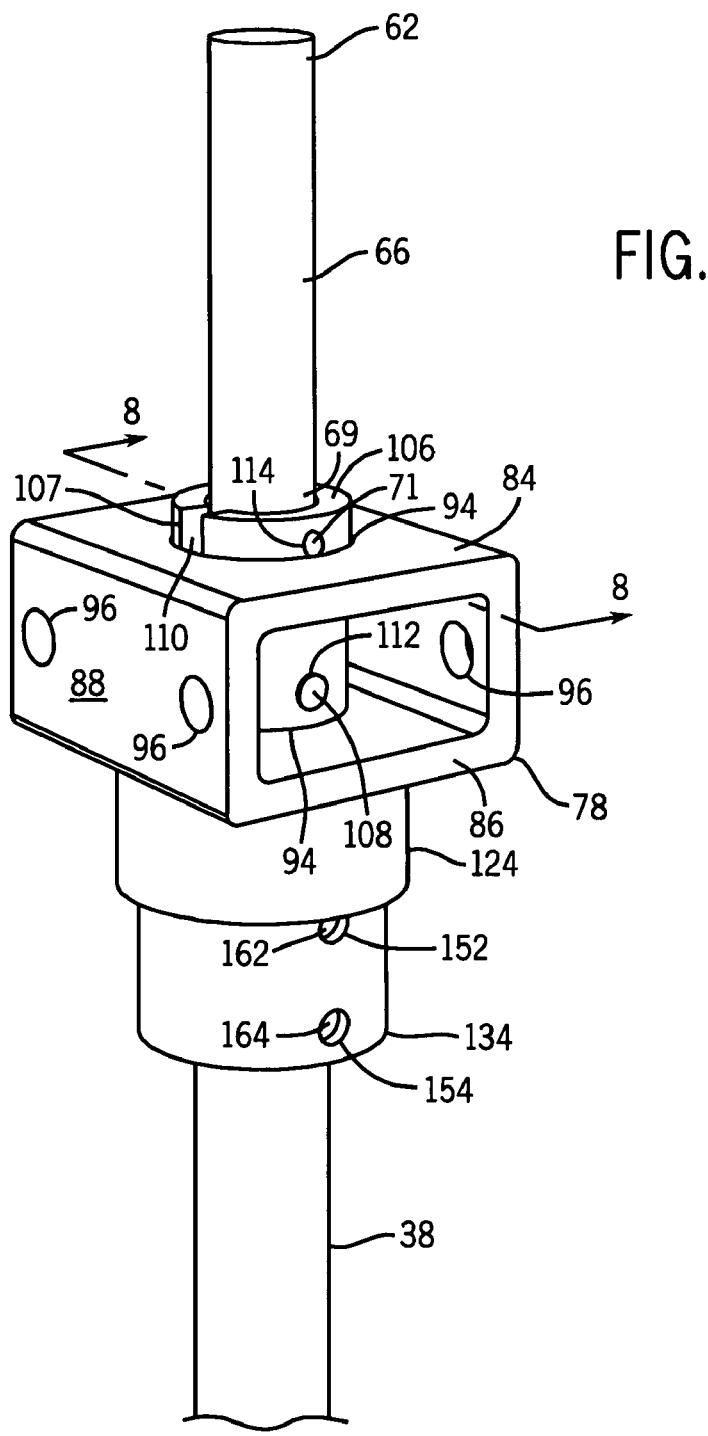
FIG. 7 is a perspective view of the connecting assembly of FIG. 6 with the drive mechanism removed.
Figure 8:
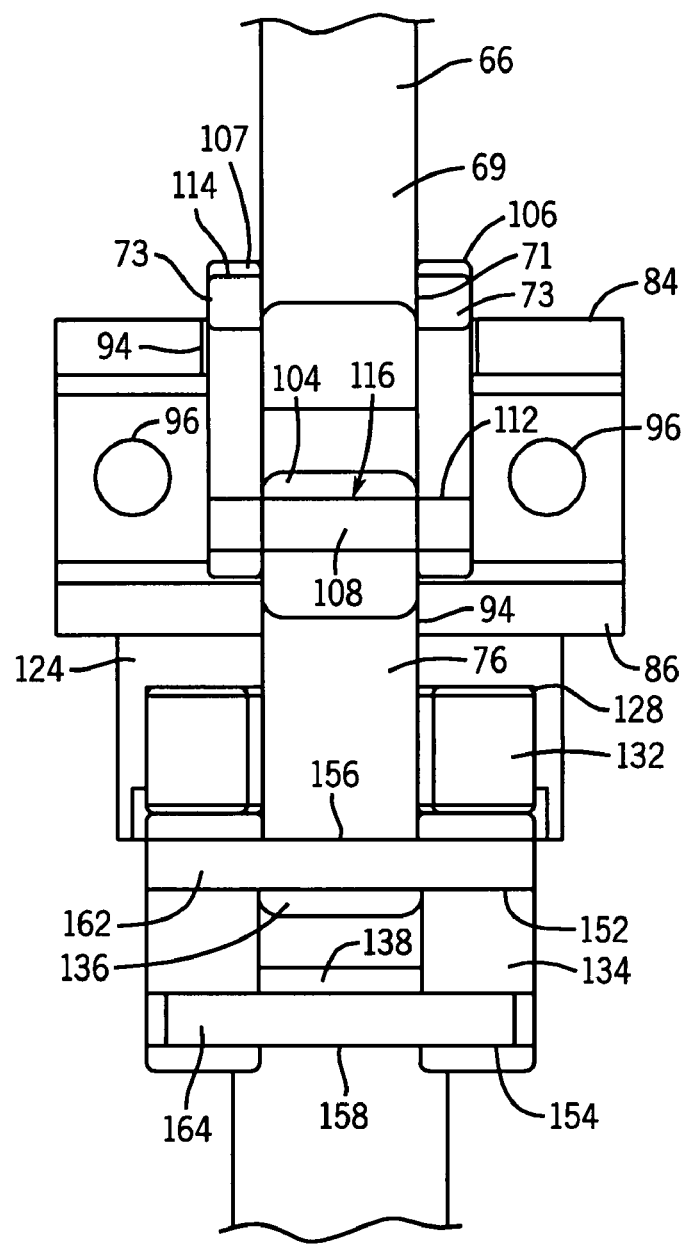
FIG. 8 is a sectional view along line 8-8 of FIG. 7 coupled to the drive shaft.
Figure 9:
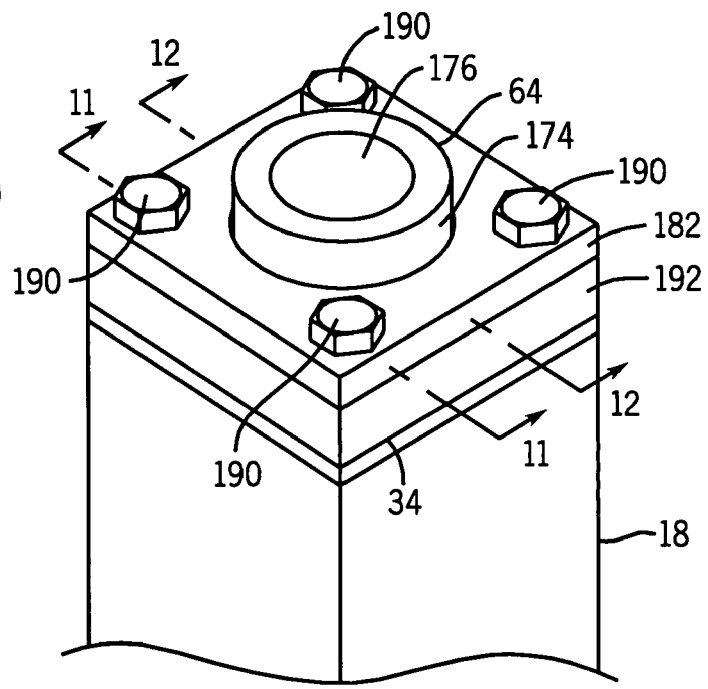
FIG. 9 is a perspective view of the top of the inner member assembly of FIG. 2.
Figure 10:
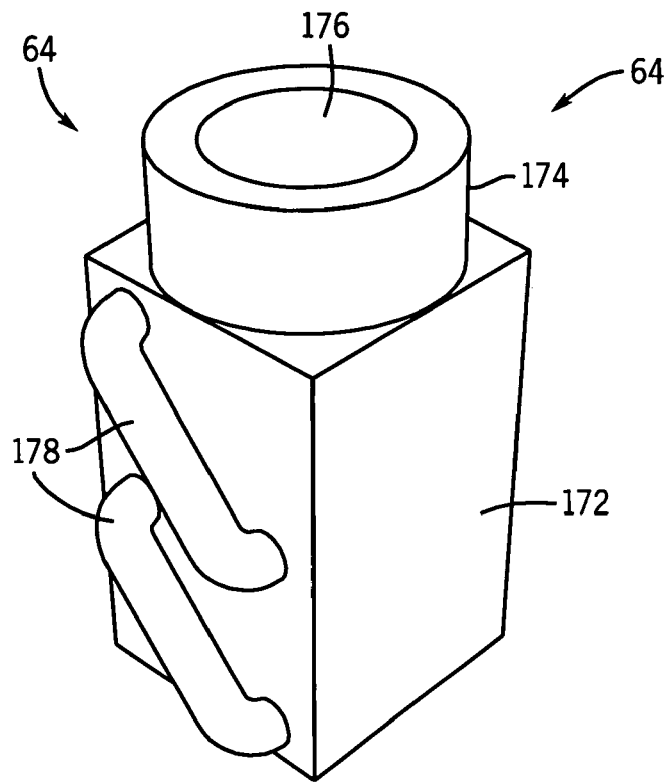
FIG. 10 is a perspective view of the ball nut of FIG. 9.
Figure 11:
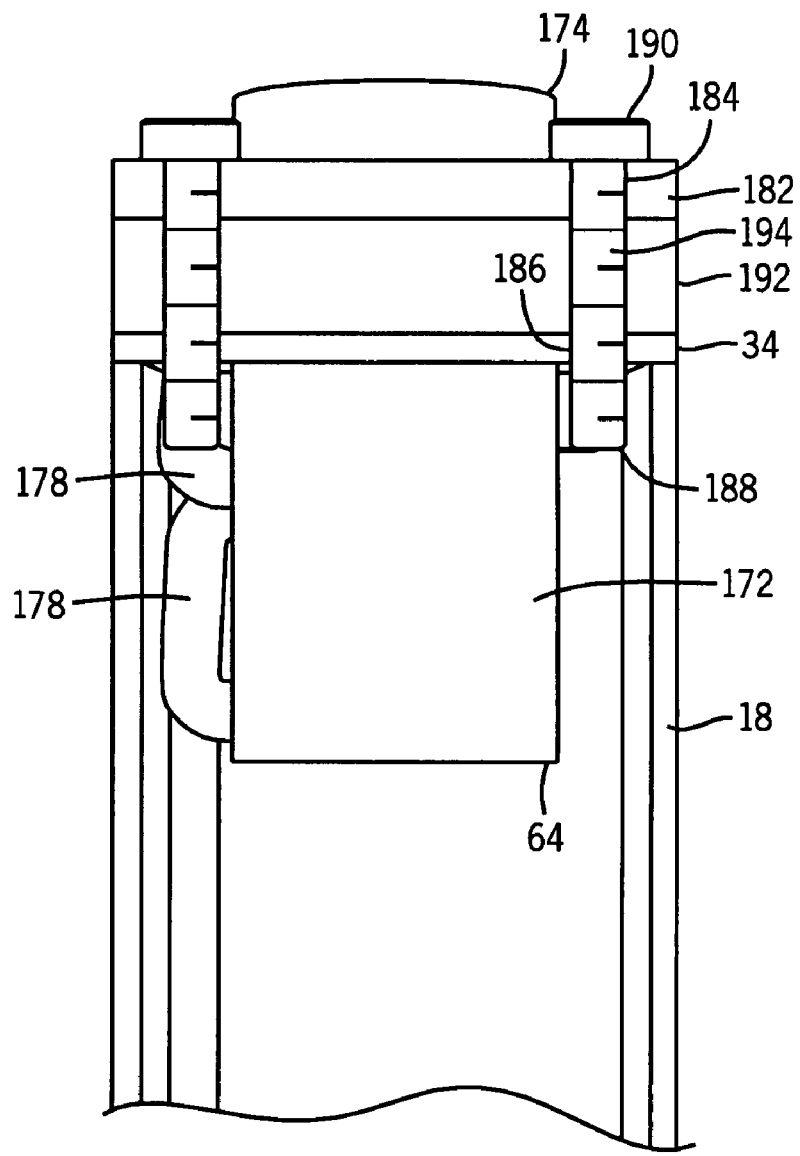
FIG. 11 is a sectional view along line 11-11 of FIG. 9.
Figure 12:
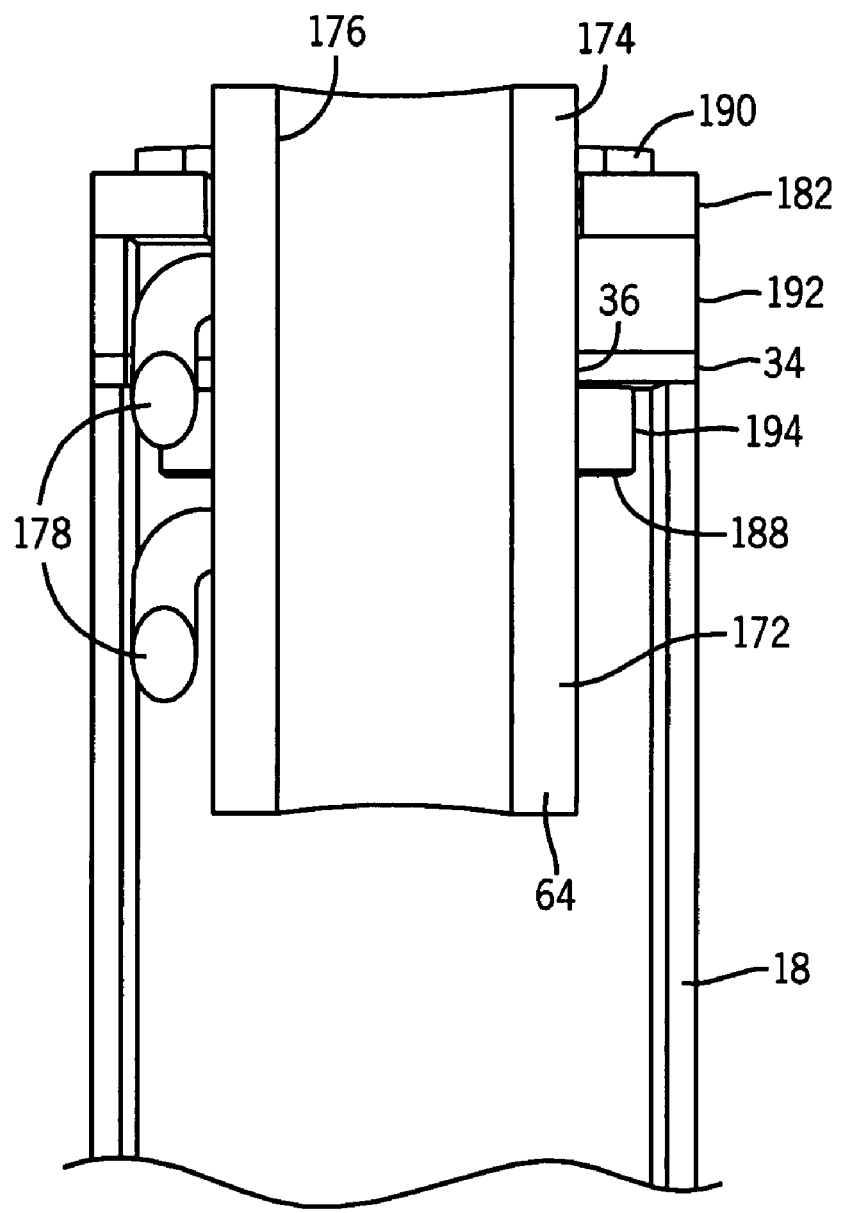
FIG. 12 is a sectional view along line 12-12 of FIG. 9.

In the embodiment shown in FIGS. 3 and 4, the inner and outer members 18, 16 are formed from standard size tube steel which does not provide a close sliding fit, and instead, forms a gap 54 between the inner and outer surfaces 52, 48 of the outer and inner members 16, 18, respectively. A low friction wear sleeve 56 formed from a low friction material, such as Ultra High Molecular Weight (UHMW) material, plastic impregnated with a lubricant, bronze, and the like, is fixed in the gap 54 to radially support the inner member 18 as the inner member 18 moves axially relative to the outer member 16. Advantageously, the wear sleeve 56 radially supports the inner member 18 as the inner member 18 moves axially relative to the outer member 16 while minimizing friction between the inner and outer members 18, 16.

Preferably, the wear sleeve 56 includes a sleeve body 57 having a first end 58 and a second end 59 joined by inner and outer surfaces 60, 61. The inner surface 60 of the wear sleeve body 57 slidably engages the outer surface 48 of the inner member 18. Outwardly extending cam surfaces 63 formed on the wear sleeve outer surface 61 frictionally engage the inner surface 52 of the outer member 16 to fix the wear sleeve 56 in the second end 26 of the outer member 16 by a friction fit. A flange 65 extending outwardly from the second end 59 of the wear sleeve 56 engages the second end 26 of the outer member 16 to prevent the wear sleeve 56 from sliding axially into the outer member 16.

Although a wear sleeve 56, such as described above is preferred because fixing the wear sleeve 56 to the outer member is simple and easy, any shaped low friction material that fills the gap 54 between the inner and outer surfaces 52, 48 of the outer and inner member 16, 18 can be provided without departing from the scope of the invention. For example, one or more strips of low friction material can be fixed to one of the inner and outer surfaces 52, 48 using any method known in the art, such as adhesives, mechanical fasteners, and the like, to radially support the inner member 18 as the inner member 18 moves axially relative to the outer member 16 while minimizing friction between the inner and outer members 18, 16 without departing from the scope of the invention. Moreover, a second wear sleeve (not shown) can be fixed to the inner member 18 proximal the first end 28 of the inner member 18 in addition to the wear sleeve 56 fixed to the outer member 16 proximal the second end 26 of the outer member 16 without departing from the scope of the invention.

As shown in FIGS. 2, 3, and 5-8, the inner member 18 is axially driven telescopically relative to the outer member 16 between a retracted position and an extended position by the drive mechanism 22. Preferably, the drive mechanism 22 rotatably drives a ball screw assembly 62 having a thread screw 38 threadably engaging a ball nut 64 resiliently fixed relative to the inner member 18. The drive mechanism 22 include, a drive shaft 66 extending from a gear box 68. The drive shaft 66 is coupled to the thread screw 38 by a connecting assembly 72. The gear box 68 is driven by an electric motor 74 to rotatably drive the drive shaft 66.

The gear box 68 houses a gear train (not shown) driven by the electric motor 74 that rotatably drives the drive shaft 66. The drive shaft 66 has a first end 67 extending into the gear box 68 and coupled to the gear train. A second end 69 of the drive shaft 66 extends out of the gear box 68 and is coupled to the connecting assembly 72. Preferably, the drive shaft second end 69 includes a transverse through hole 70 that receives a drive shaft pin 71 having a length greater than the drive shaft diameter, such that the ends 73 of the drive shaft pin 71 extend beyond the shaft diameter to rotatably fix the drive shaft 66 relative to a first coupler 106 forming part of the connecting assembly 72.

The connecting assembly 72 transfers axial and radial forces from the thread screw 38 to the outer member 16 to prevent damage to the gear box 68 coupling the electric motor 74 to the drive shaft 66. Rotational forces are transmitted from the drive shaft 66 to the thread screw 38 by a connecting shaft 76 forming part of the connecting assembly 72. Preferably, the connecting assembly 72 is detachably fixed to the outer member 16 proximal the outer member first end 24, and includes a weight bracket 78 fixed to the outer member 16 by transversely extending bolts 82 which transfer forces to the outer member 16 and simplify assembly and disassembly.

The weight bracket 78 includes a bracket top plate 84 joined to a bracket bottom plate 86 by bracket side plates 88 to form a tube having a rectangular cross section. A shaft aperture 94 formed through the outer member top plate 92, bracket top plate 84, and bracket bottom plate receives the drive shaft 66 and connecting shaft 76. Aligned apertures 96 formed through the bracket side plates 88 are aligned with apertures 98 formed through the outer member 16 and receive the transversely extending bolts 82. Advantageously, the apertures 96, 98 are positioned to locate the bolts 82 on opposing sides of the shaft aperture 94 with the shafts 66, 76 extending through the shaft aperture 94 between the bolts 82. Nuts 102 threading engaging the bolts 82 secure the bolts 82 relative to the weight bracket 78 and outer member 16.

The drive shaft 66 is coupled to the first end 104 of the connecting shaft 76 by the rotatable, cylindrical first coupler 106 received in the weight bracket shaft aperture 94. The second end 69 of the drive shaft 66 is received in a first end 107 of the first coupler 106, and a through hole 114 formed through the first end 107 of the first coupler 106 receives the ends 73 of the drive shaft pin 71 to rotatably fix the drive shaft 66 relative to the first coupler 106. A first coupler pin 108 extending radially through a through hole 112 formed through the first coupler 106 and aligned with a through hole 116 formed through the connecting shaft 76 connects the first coupler 106 to the connecting shaft 76 to rotatably couple the drive shaft 76 to the connecting shaft 66.

Advantageously, the drive shaft 66 is axially slidably received in the first coupler 106 to simplify assembly and disassembly. Moreover, the drive shaft pin ends 69 can extend into a transverse slot 110 formed in the first end 107 of the first coupler 106 to allow the first coupler 106 to float axially relative to the drive shaft 66 to further minimize axial forces being transmitted to the drive shaft 66. Although, the above arrangement is preferred, the drive shaft 66 can be coupled to the connecting shaft 76 using other methods known in the art, such as by directly connecting the drive shaft 66 to the connecting shaft 76, without departing from the scope of the invention.

A downwardly opening cup-shaped cage 124 fixed, such as by welding, to the bracket bottom plate 86 includes a shaft aperture 126 coaxial with the weight bracket shaft aperture 94. A second end 136 of the connecting shaft 76 extends through the cage shaft aperture 126 and is coupled to the ball screw assembly thread screw 38 by a second coupler 134. Of course, the cage 124 can be fixed to the weight bracket 78 using other methods known in the art, such as mechanical fasteners and the like, or be allowed to float axially, without departing from the scope of the invention.

The downwardly opening cup-shaped cage 124 defines a cavity 128 that receives a thrust bearing 132 that radially supports the connecting shaft 76. The thrust bearing 132 can be any bearing known in the art capable of transmitting axial forces. The particular thrust bearing selected for a particular application is dependent upon the connecting shaft diameter and the radial and axial forces expected in the application.

The second rotatable coupler 134 connected to the second end 136 of the connecting shaft 76 and a first end 138 of the thread screw 38 engages the thrust bearing 132. The thrust bearing 132 is axially interposed between the second coupler 134 and cage 124 and transmits axial and radial forces from the thread screw 38 through the cage 124 and weight bracket 78 into the outer member 16 through the bolts 82. Forces exerted on the outer member 16 are transferred to the vehicle 8 through a mounting plate 148 to prevent internal damage to the gear box 68. Advantageously, the axial forces exerted on the thread screw 38 are substantially transferred to the outer member 16 and not to the drive shaft 66 to minimize damage to the drive mechanism. Although a cage 124 securing the thrust bearing 132 relative to the weight bracket 78 is preferred, the thrust bearing 132 can be fixed relative to the weight bracket 78 without the cage 124, such as by securing the thrust bearing 132 directly in shaft aperture 94 formed in the weight bracket 78, without departing from the scope of the invention.

Preferably, radially extending through holes 152, 154 formed through the second coupler 134 are aligned with radially extending through holes 156, 158 formed through each of the connecting shaft 76 and thread screw 38 to receive pins 162, 164 that connect the second coupler 134 to the connecting shaft 76 and thread screw 38. The pins 162, 164 rotatably fix the connecting shaft 76 relative to the thread screw 38 to transfer the rotational forces from the drive shaft 66 to the thread screw 38. However, any method known in the art for rotatably fixing shafts together, such as flexible shaft couplings, directly connecting the shafts together without a coupler, and the like, can be used without departing from the scope of the invention.

The connecting shaft 76 rotatably drives the thread screw 38 of the ball screw assembly 62 to axially drive the ball nut 64, and thus the inner member 18, relative to the outer member 16. The thread screw 38 is an elongated shaft that extends from the first end 138 connected to the second coupler 134 and through the aperture 36 formed in the inner member top plate 34 into the inner member 18 to a second end 168. A ball nut stop 170 fixed proximal the second end 168 of the thread screw 38 prevents the thread screw 38 from disengaging the ball nut 64 past the thread screw second end 168. Threads (not shown) formed in the outer surface of the thread screw 38 between the thread screw first and second ends 138, 168 threadably engage the ball nut 64.

Referring now to FIGS. 2, 3, and 9-12, the ball nut 64 includes a rectangular body 172 having a cylindrical upper collar 174. An axially extending bore 176 formed through the ball nut 64 includes internal helical grooves (not shown). The grooves align with the helical threads formed in the outer surface of the thread screw 38 to define an internal ball path. Balls (not shown) circulating through the ball path engage the thread screw 38 to threadably engage the thread screw 38 with the ball nut 64. External ball returns 178 circulate the balls through the internal ball path. Although a thread screw 38 and ball nut 64 are preferred for certain applications, acme screws including a threaded shaft threadably engaging threads in a threaded nut fixed relative to the inner member 18 can be used without departing from the scope of the invention.

A ball nut top plate 182 fixed, such as by welding, to the ball nut 64 extends outwardly from the ball nut collar 174. Bolt holes 184 formed in each corner of the top plate 182 are aligned with threaded bolt holes 186 formed through the inner member top plate 34. Bolts 188 including a head 190 with a threaded shaft 194 extending through the nut top plate bolt holes 184 and threadably engaging the inner member top plate bolt holes 186 detachably fix the nut top plate 182, and thus the nut 64 relative to the inner member 18. Preferably, the ball nut top plate bolt holes 184 have a diameter that is greater than the diameter of the bolt shafts 194 to allow the nut top plate 182 to move axially and pivot relative to the inner member 18. The diameter of the nut top plate bolt holes 184, however, do not have a diameter that allows the bolt heads 190 to slip therethrough. Although bolts 188 threadably engaging the inner member top plate 34 are preferred to simplify assembly and disassembly, the bolts 188 can be slidably secured relative to the plates 34, 182 by nuts threadably engaging the bolts 188, clips, pins, and the like, without departing from the scope of the invention.

The ball nut 64 is resiliently fixed to the inner member 18 by a resilient member 192 that allows the ball nut 64 to pivot relative to the inner member 18 and maintain the ball nut 64 aligned with the thread screw 38. Preferably, the resilient member 192 formed from a compressible material, such as a rubber based or plastic elastomeric material, a spring, and the like, is axially interposed between the nut top plate 182 and the inner member top plate 34. The resilient member 192 can also be positioned to allow lateral movement in addition to pivotal and axial movement of the inner member 18 relative to the ball nut 64 to maintain the thread screw 38 substantially aligned with the nut 64 upon deflection of the inner member 18 relative to the outer member 16 by a side load acting on the inner member 18 without departing from the scope of the invention. Advantageously, if a side load acting on the inner member 18 urges the inner member 18 transverse to the thread screw 38, the resilient member 192 interposed between the nut top plate 182 and inner member top plate 34 allows the ball nut 64 to pivot relative to the inner member 18 and remain substantially aligned with the thread screw 38.

Although detachably mounting the nut 64 relative to the inner member 18 using bolts 188 slidably received in the bolt holes 184 through the ball nut top plate 182 is preferred, any fastener can be used, such as clips, clamps, pins, and the like, without departing from the scope of the invention. In certain applications, the nut 64 can be fixed relative to the inner member 18 using methods that do not allow detaching the nut 64 from the inner member 18 without departing from the scope of the claims. Moreover, if resiliently fixing the nut 64 relative to the inner member 18 is not desired, the resilient member 192 can be omitted.

As shown in FIG. 3, a first biasing member 202, such as a Belleville washer, axially interposed between the nut 64 and the second coupler 134 cushions the inner member 18 relative to the outer member 16 when the inner member 18 is retracted into the outer member 16 to the retracted position. The first biasing member 202 is compressed when the inner member 18 reaches an upper limit to cushion the inner member 18 relative to the outer member 16 when the inner member 18 is retracted into the outer member 16 to the retracted position. Likewise, a second biasing member 204 interposed between the nut 64 and nut stop 170 cushions the inner member 18 relative to the outer member 16 when the inner member 18 is driven out of the outer member 16 to the extended position.

Advantageously, the biasing members 202, 204 can be selected to have a spring constant that increases the amperage draw of the electric motor 74 sufficiently to signal a control system (not shown) controlling the motor 74 that the inner member 18 is approaching the upper or lower limits of inner member travel prior to coming to an abrupt stop at the limit. Although Belleville washers encircling the thread screw 38 are preferred because they can be selected with a sufficiently high spring constant that significantly increases the amperage draw of the electric motor 74, any biasing member, such as a spring, a rubber based material, a biasing plastic based material, and the like, axially interposed between the nut 64 and the second coupler 134 and/or stop 170 can be used without departing from the scope of the invention. Moreover, the biasing members 202, 204 can be axially interposed anywhere between the inner member assembly including the nut 64 and an outer member assembly including the thread screw 38 without departing from the scope of the invention.

Figure 2:
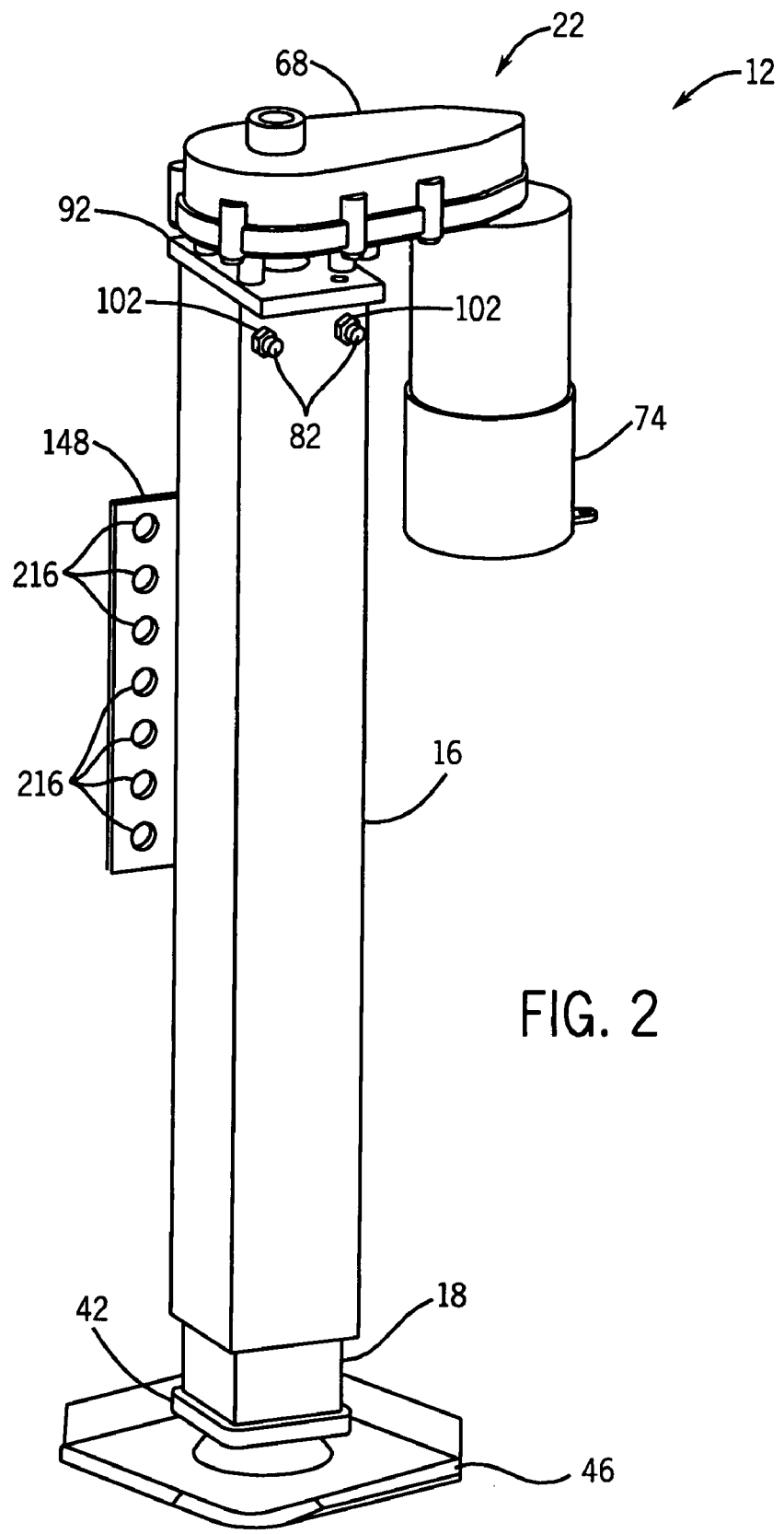
FIG. 2 is a perspective view the extendible leg of FIG. 1.

As shown in FIGS. 2 and 3, a foot 46 mounted to the inner member second end 32 engages a supporting surface to lift and steady the vehicle 8. The foot 46 provides a large surface area for engagement with the supporting surface to prevent the extendible leg 12 from sinking or forming a depression in the surface. Preferably, the foot 46 is mounted to the second end 32 of the inner member 18 by a bolt 208 threadably engaging a threaded aperture 212 formed through the bottom plate 42 closing the second end 32 of the inner member 18. A pivot bushing 214 encircling the bolt 208 and disposed between the bottom plate 42 and foot 46 can be provided. Of course, the foot 46 can be mounted to the inner member 18 using any method known in the art, such as pivotally mounting the foot 46 to the inner member 18 to accommodate an uneven ground or other non-level supporting surface, without departing from the scope of the invention.

The mounting plate 148 fixed, such as by welding, to the outer member 16 adapts the extendible leg 12 for mounting to the vehicle 10. Preferably, the mounting plate 148 includes a plurality of parallel holes 216 to accommodate a variety of mounting holes on the vehicle 10 for bolting the extendible leg 12 to the vehicle 10. Of course, the mounting plate 148 can be omitted, and the extendible leg 12 can be adapted for mounting to the vehicle 10 by welding, strapping, clamping, and the like, to the vehicle 10 without departing from the scope of the invention.

Referring now to FIGS. 1-12, each extendible leg 12 is assembled by fixing the wear sleeve 56 in the second end 26 of the outer member 16 and slipping the inner member 18 into the outer member second end 26 such that the first end 28 of the inner member 18 extends past the first end 24 of the outer member 16. The second biasing member 204 is positioned between the ball nut 64 and nut stop 170, and the ball screw assembly 62 including the thread screw 38 and ball nut 64 is bolted to the inner member 18 with the resilient member 192 interposed between the ball nut top plate 182 and inner member top plate 34 to form the inner member assembly.

The outer member 16 having the mounting plate 148 fixed thereto is assembled with the inner member assembly by positioning the first biasing member 202 between the nut 64 and second coupler 134 and connecting the thread screw first end 138 to the second coupler 134. The connecting shaft 76 is then slipped through the shaft aperture 126 formed through the cage 124 and the weight bracket shaft aperture 94. The second end 136 of the connecting shaft 76 is connected to the second coupler and the first end of the connecting shaft 76 is connected to the first coupler 106. The first coupler 106 is then connected to the drive shaft 66.

Once the inner member assembly is completed and the drive shaft 66 is coupled to the thread screw 38 the outer member is slipped axially over the connecting assembly 72, such that the apertures 98 formed in the outer member 16 align with the apertures 96 formed through the weight bracket 78. The bolts 82 are slipped through the aligned apertures 96, 98 and secured with the nuts 102 to fix the weight bracket 78 relative to the outer member 16. Finally, the foot 46 is bolted to the inner member bottom plate 42 to complete assembly of the extendible legs 12. Of course, the order of assembly steps described above can be altered by one skilled in the art without departing from the scope of the invention. Advantageously, the extendible legs 12 can be easily disassembled by reversing the order of the assembly steps.

In use, the extendible leg inner member 18 is axially moved between the extended and retracted position by energizing the motor 74 to rotate the thread screw 38. Rotation of the thread screw 38 axially drives the ball nut 64, and thus the inner member 18. In one direction of rotation of the thread screw 38, the inner member 18 is driven toward the extended position until the desired extension of the inner member 18 is achieved or the ball nut 64 engages the second biasing member 204 adjacent the ball nut stop 170 which cushions the ball nut 64 and increases the motor amperage to signal the control system to turn off the motor 74. In an opposite direction of rotation, the inner member 18 is driven toward the retracted position until the inner member 18 is retracted to a desired position or the ball nut 64 engages the first biasing member 202 which cushions the ball nut 64 and increases the motor amperage to signal the control system to turn off the motor 74. Advantageously, if a side load acting on the inner member 18 urges the inner member 18 transverse to the thread screw 38, the resilient member 192 interposed between the nut top plate 182 and inner member top plate 34 allows the nut 64 to pivot relative to the inner member 18 and remain substantially aligned with the thread screw 38 to prevent the thread screw from binding in the nut 64.

Figure 13:
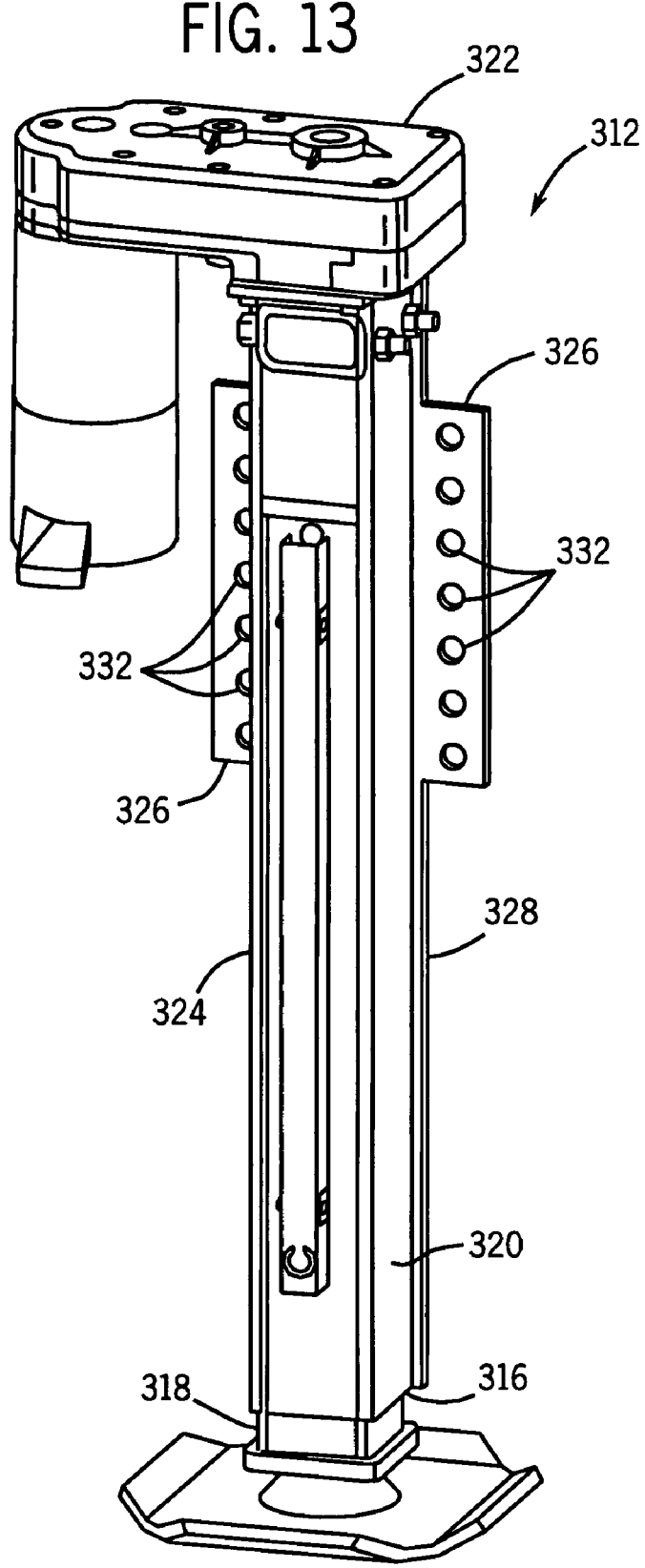
FIG. 13 is an alternative embodiment of an extendible leg suitable for use in the vehicle of FIG. 1.

In an alternate embodiment shown in FIGS. 13 and 14, an extendible leg 312 proximal each corner of the vehicle 10 shown in FIG. 1 includes an outer member 316 and a telescoping inner member 318. The telescoping inner member 318 is forcibly slidably driven by a drive mechanism 322 between a retracted and an extended position.

The tube shaped outer member 316 is formed from a U-shaped length of material 320, such as steel, which is joined to a back plate 324, such as by welding. Advantageously, forming the outer member 316 from two pieces reduces material costs. Wings 326 extending from longitudinal edges 328 of the back plate 324 include a plurality of parallel holes 332 to accommodate a variety of mounting holes on the vehicle 10 for bolting the extendible leg 312 to the vehicle 10.

In the embodiment disclosed in FIGS. 13 and 14, a linear hall sensor 334 fixed relative to the outer member 316 senses the position of the inner member 318 relative to the outer member 316. Advantageously, by knowing the position of the inner member 318 relative to the outer member 316, the drive mechanism 322 can be turned off, either manually or automatically, prior to the inner member 318 reaching a physical stop which can damage the drive mechanism 322. Although a linear hall sensor 334 is disclosed, any sensor known in the art can be used, such as limit switches, non-linear sensors, and the like, for determining the position of the inner member 318 relative to the outer member 316 without departing from the scope of the invention.

While there has been shown and described what are at present considered the preferred embodiment of the invention, it will be obvious to those skilled in the art that various changes and modifications can be made therein without departing from the scope of the invention. For example, the drive system can be provided with a manual override, a third member can be provided to provide a quick to ground feature, and the like, without departing from the scope of the invention.

We claim:

1. An extendible leg adapted for mounting to a vehicle, said leg comprising:
   an outer member;
   an inner member telescoped slidably into said outer member, said inner member having a first end extending axially beyond said outer member;
   a nut fixed relative to said inner member;
   a rotatable screw axially fixed relative to said outer member and threadably engaging said nut, wherein rotation of said screw axially drives said nut to axially move said inner member relative to said outer member; and
   a resilient member interposed between said inner member and said nut to maintain said screw substantially aligned with said nut upon deflection of said inner member relative to said outer member by a side load.

2. The extendible legs as in claim 1, in which said resilient member is rubber.

3. The extendible leg as in claim 1, including a biasing member interposed between said inner member and said outer member to axially cushion said inner member relative to said outer member.

4. The extendible leg as in claim 3, in which said biasing member is a Belleville washer.

5. The extendible leg as in claim 1, in which said inner member includes an outer surface which moves axially relative to an inner surface of said outer member, and a low friction material is interposed between said inner and outer surfaces.

6. The extendible leg as in claim 1, wherein said screw is rotatably driven by a shaft detachably coupled to a said screw.

7. The extendible leg as in claim 1, further comprising a foot fixed to said second end of said inner member.

8. An extendible leg adapted for mounting to a vehicle, said leg comprising:
   an outer member assembly including an outer member and a rotatable screw axially fixed relative to said outer member;
   an inner member assembly including an inner member and a nut fixed relative to said inner member, said inner member telescoped slidably into said outer member and having a first end extending axially beyond said outer member, said screw threadably engaging said nut, wherein rotation of said screw axially drives said nut to axially move said inner member relative to said outer member; and
   a resilient member interposed between said inner member and said nut to maintain said screw substantially aligned with said nut upon deflection of said inner member relative to said outer member by a side load; and
   a biasing member interposed between said inner member assembly and said outer member assembly to axially cushion said inner member relative to said outer member.

9. The extendible leg as in claim 8, in which said resilient member is rubber.

10. The extendible legs as in claim 8, in which said biasing member is a Belleville washer.

11. The extendible leg as in claim 8, in which said inner member includes an outer surface which moves axially relative to an inner surface of said outer member, and a low friction material is interposed between said inner and outer surfaces.

12. The extendible leg as in claim 8, wherein said screw is rotatably driven by a shaft detachably coupled to said screw.

13. The extendible leg as in claim 8, further comprising a foot fixed to said second end of said inner member.

14. An extendible leg adapted for mounting to a vehicle, said leg comprising:
   an outer member;
   an inner member telescoped slidably into said outer member, said inner member having a first end extending axially beyond said outer member, and including an outer surface which moves axially relative to an inner surface of said outer member;
   a nut fixed relative to said inner member;
   a rotatable screw axially fixed relative to said outer member and threadably engaging said nut, wherein rotation of said screw axially drives said nut to axially move said inner member relative to said outer member; and
   low friction material interposed between said inner and outer surfaces of said outer and inner members.

15. The extendible leg as in claim 14, including a resilient member interposed between said inner member and said nut to maintain said screw substantially aligned with said nut upon deflection of said inner member relative to said outer member by a side load.

16. The extendible leg as in claim 15, in which said resilient member is rubber.

17. The extendible leg as in claim 14, including a biasing member axially interposed between said inner member and said outer member to axially cushion said inner member relative to said outer member.

18. The extendible leg as in claim 17, in which said biasing member is a Belleville washer.

19. The extendible leg as in claim 14, wherein said screw is rotatably driven by a shaft detachably coupled to said screw.

20. The extendible leg as in claim 14, further comprising a foot fixed to said second end of said inner member.

* * * * *

UNITED STATES PATENT AND TRADEMARK OFFICE
CERTIFICATE OF CORRECTION

PATENT NO.        : 7,296,779 B2
APPLICATION NO. : 11/287763
DATED             : November 20, 2007
INVENTOR(S)       : Bakshi et al.

It is certified that error appears in the above-identified patent and that said Letters Patent is hereby corrected as shown below:

Column 10, Line 58, Claim 2 "legs" should be changed to -- leg --

Column 11, Line 5, Claim 6 "to a said" should be changed to -- to said --

Column 11, Line 33, Claim 10 "legs" should be changed to -- leg --

Signed and Sealed this

Twenty-seventh Day of May, 2008

JON W. DUDAS
*Director of the United States Patent and Trademark Office*